Feb. 26, 1963 F. J. EGAN 3,078,566
CONFINED EXTRUSION METHOD OF MAKING HOLLOW ARTICLES
Filed May 1, 1957 2 Sheets-Sheet 1

INVENTOR
Francis J. Egan
BY
ATTORNEYS

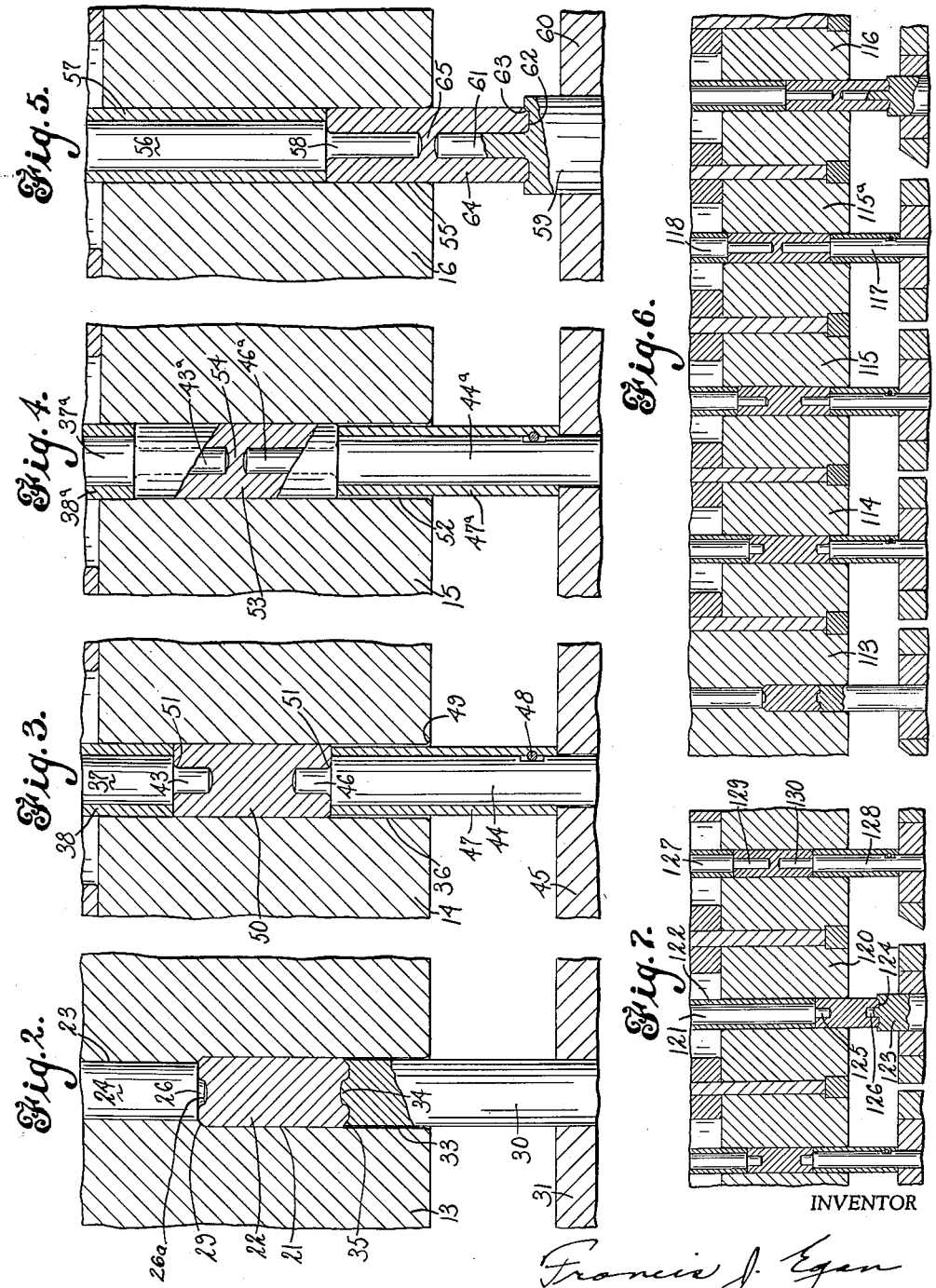

United States Patent Office 3,078,566
Patented Feb. 26, 1963

3,078,566
CONFINED EXTRUSION METHOD OF MAKING HOLLOW ARTICLES
Francis J. Egan, Cheshire, Conn., assignor to The Cold Forming Manufacturing Company, Waterbury, Conn., a corporation of Connecticut
Filed May 1, 1957, Ser. No. 656,246
2 Claims. (Cl. 29—534)

This invention relates to a method of, and an apparatus for, making hollow articles and more particularly for making an elongated connector blank having an opening extending into the blank from each end face thereof. The method involves particularly the production of impact extrusion of the metal at opposite ends of a workpiece or blank while the blank is completely confined. This effects the penetration of a pin into each face of the blank at the same time that the metal of the blank is extruded outwardly around the pin but confined at its ends to limit the extent of this longitudinal extrusion.

The invention is illustrated in connection with the manufacture of a so-called connector used in electrical work which, as illustrated, comprises a metal body of cylindrical shape having an opening extending inwardly from each end face thereof to a point adjacent the center of the article but leaving a relatively thin web of material between the bottoms of the two openings.

Some difficulty has been encountered in the past in cold forging or cold forming such articles and producing a completed blank which will be completely and accurately formed with smooth exterior and interior surfaces and without the formation of fins or rough edges which requires removal after the forging or pressing operations.

In the method and apparatus illustrated the workpiece is first cut from a piece of rod or bar stock, preferably cylindrical in shape, and this workpiece is carried successively to a number of dies provided in the machine at each of which die stations certain operations are performed on the blank which contribute to the end product. When the blank has been operated upon at the final station in the machine and is discharged from the die at this station, it is in its completed and final form and no further operations upon it are necessary.

One object of the present invention is to provide an improved method of making a hollow article such as a blank having openings extending inwardly from opposite ends thereof.

A further object of the invention is to provide a method of producing a blank of the character described by effecting simultaneously impact extrusions at opposite ends of a workpiece while confining the workpiece in a die by means of a punch or punches.

A still further object of the invention is to provide a new apparatus for making a hollow article by producing simultaneously impact extrusions at the opposite ends of a workpiece while the latter is confined in a die.

To these and other ends the invention consists in the novel features and combinations of parts to be hereinafter described and claimed.

In the accompanying drawings:

FIG. 2 is an enlarged sectional view showing the work performed at the second operating station of the apparatus;

FIGS. 3, 4 and 5 are views similar to FIG. 2 showing the operations performed at the third, fourth and last stations of the apparatus;

FIG. 6 is a sectional view on a reduced scale of a modified form of apparatus for performing my improved method; and FIG. 7 is a view similar to FIG. 6 showing a modified form of apparatus for performing a slightly modified process.

Figure 1:
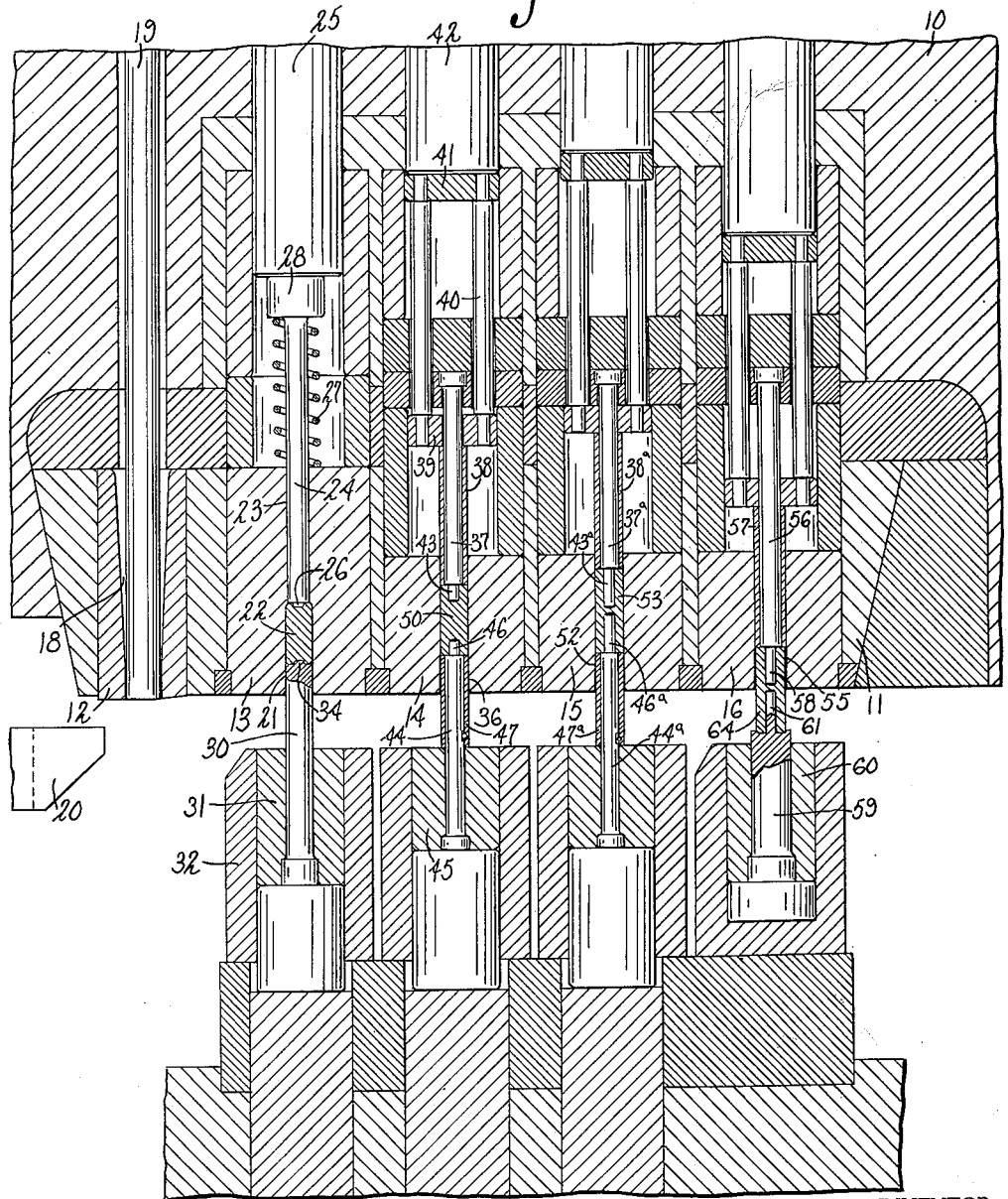
FIG. 1 is a sectional view of an apparatus embodying my invention in which apparatus my improved process may be expeditiously performed.

To illustrate one embodiment of the invention I have shown in the drawings an apparatus comprising a frame 10 in which is supported a die bed 11 having dies 12, 13, 14, 15 and 16 supported therein.

The die 12 is a cut-off die and is provided with an opening 18 to receive a piece of bar stock 19, in this instance cylindrical in cross-sectional form, this die serving as a cut-off die. It will be understood that the stock 19 is fed progressively through the die where a protruding end will be severed by a knife shown diagrammatically at 20. The end so cut serves as the workpiece from which the hollow article is formed.

This workpiece is then transferred to the die 13 at what may be termed the second station of the machine although it is the first operating station. It will be understood that the transfer may be made by the knife 20 or by any suitable transfer mechanism well known in the art.

The die 13 is provided with an opening 21 to receive the blank or workpiece, which is indicated at 22, which opening extends to the face of the die. An opening 23 of reduced size leads rearwardly from the opening 21, and in this opening is slidably received a die punch or mandrel 24 which is actuated by a knock-out rod 25. The member 24 serves to confine the inner end of the workpiece 22 and also serves as a knockout member to eject the work from the die.

At its forward end the punch or mandrel 24 is provided with a projecting nose portion 26 which serves to indent the upper end of the workpiece as shown at 26a and this punch is urged rearwardly by a spring 27 which embraces the punch and reacts between the rear end of the die 13 and the head 28 of the punch. This spring is intended to retract the punch sufficiently far so that the nose 26 will not protrude beyond the face of the die 13 when the blank is about to be received in the die. It will be noted that, as shown more particularly in FIG. 2, the upper end of the opening 21 is provided with a bevel or rounded portion 29 which in the working process forms a chamfer at the upper edge of the blank.

A punch 30 is adapted to cooperate with the die 13, this punch being held in a punch holder 31 supported in a reciprocating gate 32, which gate is actuated in the usual and well-known manner. At this station the punch is rigidly carried by the die holder but, as shown at 33 of FIG. 2, has a slight clearance in the die opening 21 to prevent wear on the tools. Also the forward end of the punch 30 is provided with a projecting nose 34 which is designed to indent the outer end of the blank, and the end of the punch surrounding the projecting nose 34 is shaped, as shown at 35, to provide a chamfer on the outer face of the blank.

In the operation of the machine, when the gate 32 is withdrawn from the die bed and the die opening 21 is ready to receive a workpiece, the punch 24 will be retracted rearwardly by the spring 27 until the nose 26 is withdrawn within the die opening. The workpiece is then transferred to a position in front of the die opening into which it is driven by the punch 30 upon advance of the gate. The blank or workpiece is compressed between the die punch 24 and the gate punch 30 and its end faces slightly indented and the blank forged into the shape required to fill the space within the die and between the punches. Both ends of the blank, as clearly seen in FIG. 2, are indented and also around the indentation both edges are provided with a chamfer.

Upon withdrawal of the gate after the forging operation has been effected, the blank is ejected from the die by the knock-out punch or mandrel 24 upon advance of the knock-out rod 25. As the blank is ejected it is received by transfer fingers provided therefor and transferred to the next station in the machine or to a position in front of the opening in the die 14.

This die is provided with an opening 36 to receive the blank, and a punch or mandrel 37 extends into the die opening from the rear end thereof. In this instance the die punch is fixed with respect to the die and is considerably smaller in diameter than that of the opening 36. A knock-out sleeve 38 surrounds the punch 37 and is actuated, as shown in FIG. 1, by a head member 39 from which extend pins 40 secured to a block 41 which is in turn engaged by a knock-out rod 42. This sleeve 38 not only serves as the ejecting member to eject the blank from the die after the work has been performed at this station but also serves along with the punch 37 to confine the inner end of the blank during the extrusion process. It will be understood that the punch 37 has a sliding fit within the sleeve 38 which in turn has a sliding fit in the die opening 36.

A pin 43 is provided at the end of the punch 37, which pin is adapted to pierce the blank, and pressure upon the latter causes extrusion of the metal of the blank rearwardly about the pin.

Cooperating with the die 14 is a gate punch 44, which punch is carried in a holder 45 in the gate 32. This punch is provided with a pin 46 adapted to pierce the outer face of the workpiece or blank and effect extrusion of the metal of the blank forwardly about this pin.

The punch 44 is mounted loosely in the punch holder 45 with a slight clearance therebetween so that slight play is provided between the punch and the punch holder to permit the punch to be properly guided into the opening in the blank without undue strain upon the tools.

This punch is embraced by a sleeve 47 which has a sliding fit upon the punch 44 and is secured to the punch by being pinned thereto as indicated at 48 so as to permit slight longitudinal movement between the punch and the sleeve. By this provision the sleeve may also bottom against the holder 45 to relieve strain upon the small pin 48. There is a slight clearance between this sleeve and the opening 36 in the die so as to permit slight play between these parts to relieve the strain on the punch 44, this opening, however, not being of sufficient size to permit extrusion of the material thereinto which might provide a fin or burr upon the workpiece.

When the workpiece 22 is transferred to a position in front of the opening 36 of the die 14, the gate is moved toward the die and the pins 43 and 46 enter the indentations 26a and 34 provided in the faces of the workpiece at the previous station, and the punch 44 is thereby guided in its forward movement into the die opening. It is for this reason that the punch 44 and sleeve 47 are permitted slight play, and by this provision there will be less wear on both punch and die.

Upon continued movement of the gate toward the die bed the workpiece will be confined between the ends of the punches 44 and 37, and the insertion of the pins 43 and 46 into the workpiece will effect extrusion of the metal thereof about these pins as is permitted by the confining space within the die between the punches. The sleeves 38 and 47 also serve to confine the metal of the blank and shape the end faces thereof. Thus the blank is completely confined at both ends and the metal thereof extruded at both faces about the pins 43 and 46. The pin 46 is received in the indentation made by nose 34 and guided into the opening in the die thereby to prevent the fouling of the mouth of the die opening by the sleeve 47. The mouth of the die opening at this station as well as in other stations in the machine may be provided with a slight bevel 49 to facilitate the entry of the workpiece therein.

After completion of the operation at station No. 3 of the machine, as shown in FIG. 3, the blank is of the form designated at 50 at this station, and it will be seen that relatively deep indentations are made in each end and the metal displaced by these indentations has been extruded outwardly toward each end face about the pins 43 and 46. At the base of these pins fillets 51 may be provided on the punches so as to give the mouth of the openings in the blank 50 a slight flare.

The blank is now transferred to the die 15 at station No. 4 wherein the mechanism is substantially like that shown in FIG. 3. In this instance, however, the pins 43a and 46a are considerably longer than the corresponding members 43 and 46 at station No. 3 so as to deepen the openings formed through each face of the blank. The punch 37a and sleeve 38a are substantially like the members 37 and 38 shown in FIG. 3, and also the punch 44a and sleeve 47a are similar to the corresponding members 44 and 47 and are secured to the gate 32 in the same manner. At this station, shown in FIG. 4 of the drawings, the punch is also loosely mounted in the gate and the sleeve 47a has a sliding fit on the punch 44a and has some clearance within the opening 52 in the die 15. The operation at this station is quite similar to the third station previously described except that, as the pins 43a and 46a are longer, deeper openings are made in the ends of the blank and, as shown in FIG. 4, these openings extend almost to the center of the blank 53, leaving a narrow web of material 54 between the inner ends or bottoms of the openings.

Upon ejection of the blank 53 from the die 15 by the knock-out sleeve 38a, it is transferred to a position in front of the opening 55 in the die 16 at the fifth or last station of the machine. Here is provided a die punch 56 embraced by a knock-out sleeve 57 as in the third and fourth stations of the machine. The punch 56 is provided with a pin 58 which is substantially the same length as the pin 43a although it may be slightly longer, if desired, so as to again deepen the opening in the rear face of the blank.

Cooperating with the punch 56 and sleeve 57 is a punch 59 secured to a punch holder 60 in the gate 32. This punch is held rigidly in the holder 60 and is provided with a projecting pin 61 and an annular recess 62 about the base of the pin 61 to provide a chamfer 63 on the end of the blank. The operation at FIG. 5 consists in providing the desired shape upon the end faces of the blank, particularly the outer face, as a slight chamfer upon the inner face is preserved at all of the working stations of the machine. After the process at the last station, the blank is in the form designated at 64 in FIG. 5. It will be seen that the openings extend substantially therethrough except for the thin web of material 65. Moreover, the end faces of the blank as well as the circumferential surface thereof are smoothly formed and chamfered as desired. Moreover, with the present method and tools, wear on the latter is greatly diminished so that the tools have a long working life. The completed article shown in FIG. 5 is thus produced by progressive cold forming operations with a minimum of effort and minimum wear on the tools.

In the event that longer blanks are desired and, therefore, deeper openings made from the ends of the workpiece, the operations previously described in connection with FIGS. 3 and 4 may be repeated if desired prior to the final operation described in connection with FIG. 5. Such a modification is shown in FIG. 6 wherein a number of dies 113, 114, 115 and 116 are illustrated. The operation performed in the die 113 is substantially similar to that of die 13 shown in FIG. 2 and the operations in dies 114 and 115 correspond to the operation previously described as being performed in dies 14 and 15 in FIGS. 3 and 4. In view of the fact, however, that a blank of longer dimensions is employed in this instance, a further station at which a die 115a is provided and cooperating tools 117 and 118 are provided, which tools serve to deepen the openings provided through the end faces of the blank. With the exception of the fact that the pins upon the punches 117, 118 are longer than those shown in FIG. 4 upon the punches 37ª and 44ª, the construction of the tools at this station is substantially the same as those shown in FIG. 4.

Also at the last station of this modified form of my apparatus the die 116 and the tools cooperating therewith are substantially like those shown in FIG. 5. It will, of course, be understood that as many intermediate stations may be provided between the second and last stations as is necessary to provide the proper depth of openings in the blank.

It may in some instances be found expedient to form the chamfer on the outer end of the blank at an earlier stage in the manufacture thereof. Such a process is shown in FIG. 7 of the drawings where it may be said the operations performed at the last two stations of the machine have been reversed. In other words, in FIG. 7 of the drawings the tools at the fourth station of the machine (corresponding to those shown in FIG. 5) consist of a die 120 having a die punch 121 and knock-out sleeve 122 received in the die opening. In this instance the punch 123 rigidly secured in the gate of the machine is provided with an end surface 124 adapted to effect a chamfer on the end of the blank. The punches 121 and 123 are provided with relatively short pins 125 and 126 which are substantially the same length as those shown in the previous station. At the following station the punches 127 and 128 are provided with relatively long pins 129 and 130 to deepen the openings formed in the blank in a manner similar to that previously described in connection with FIG. 4. The chamfer formed upon the outer face of the blank at the previous station is retained at this station and the openings through the outer edges of the blank are perfected to their final depth. Here again, if the blank is of a length which requires it, a sufficient number of operations may be performed after the chamfer operation in die 120 to provide the openings of the required depth in the ends of the blank.

It will be understood that, if desired, the projections 26 and 34 on the punches 24 and 30 may be omitted from the tools in the first operating station of the apparatus illustrated in FIG. 2. In that case the operation at this station would consist of squaring the blank and providing the chamfer on the die face of the blank by the rounded portion 29 of the die opening. The operation would be the same as previously described except for the small indentations made at each face of the blank.

While I have shown and described some preferred embodiments of my new process and the apparatus for carrying out the process, the invention is not to be limited to all of the details shown but is capable of modification and variation within the spirit of the invention and within the scope of the appended claims.

What I claim is:

1. The method of cold forming, by extrusion simultaneously in opposite axial directions, a metal piece c predetermined mass, length and external cross section: dimensions, having axially aligned bores extending ir wardly from the opposite ends of the piece to a we separating the bores internally, comprising laterally cor fining the sidewalls of a blank, having said predeter mined mass an external cross sectional dimension: against lateral flow throughout its entire length, subse quently simultaneously penetrating the opposite ends o the blank axially in opposite directions from the ends tc ward the middle of the blank while maintaining said side wall confinement to initiate formation of the said bore by extrusion of metal axially of the blank elongatin the blank in both directions, subsequently arresting th axial extrusion by relatively advancing a confining wal axially toward and against each extruded end when sai predetermined length is attained and simultaneously ai resting said penetration to leave the said web internall separating the bores.

2. The method of making hollow elongated meta articles of predetermined mass, length and external cros sectional dimension and having axially aligned bores ex tending inwardly from the opposite ends to a web sep arating the bores internally, which comprises cutting from a length of solid metal stock, a blank having th said predetermined mass and external cross sectional di mensions of the finished article, laterally confining th side walls of the blank against lateral flow throughou its entire length, subsequently simultaneously penetratin, the opposite ends of the blank axially in opposite di rections from the ends toward the middle of the blan] while maintaining said sidewall confinement to initiat formation of the said bores by extrusion of metal axiall of the blank elongating the blank in both directions, sub sequently arresting the axial extrusion by relatively ad vancing a confining wall axially toward and against eacl extruded end when said predetermined length is attained and simultaneously arresting said penetration to leav the said web internally separating the bores.

References Cited in the file of this patent

UNITED STATES PATENTS

| | | |
|---|---|---|
| 1,977,162 | Wilcox | Oct. 16, 193. |
| 2,057,527 | Johnson | Oct. 13, 193( |
| 2,183,637 | Bignelli | Dec. 19, 193! |
| 2,215,943 | Traut | Sept. 24, 194( |
| 2,395,721 | Buchet | Feb. 26, 194( |
| 2,417,569 | Rice | Mar. 18, 194' |
| 2,689,359 | Friedman | Sept. 21, 195. |
| 2,731,859 | Kendall | Jan. 24, 195( |
| 2,732,738 | Krause | Jan. 31, 195( |
| 2,747,270 | Crawford | May 29, 195( |
| 2,751,676 | Kaul | June 26, 195( |
| 2,814,812 | Stern | Dec. 3, 195: |

FOREIGN PATENTS

| | | |
|---|---|---|
| 523,104 | Germany | Apr. 20, 193] |